(12) United States Patent
Pan et al.

(10) Patent No.: US 12,547,525 B2
(45) Date of Patent: Feb. 10, 2026

(54) VALIDATION OF CODE TRANSLATION USING INTERMEDIATE REPRESENTATION

(71) Applicant: International Business Machines Corporation, Armonk, NY (US)

(72) Inventors: Rangeet Pan, White Plains, NY (US); Saurabh Sinha, Danbury, CT (US); Rahul Krishna Prasad, White Plains, NY (US); Julian Timothy Dolby, Bronx, NY (US); Venkata Nagaraju Pavuluri, New Rochelle, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 18/346,180

(22) Filed: Jun. 30, 2023

(65) Prior Publication Data

US 2025/0004909 A1 Jan. 2, 2025

(51) Int. Cl.
*G06F 11/3604* (2025.01)

(52) U.S. Cl.
CPC .............. *G06F 11/3608* (2013.01)

(58) Field of Classification Search
CPC .................................. G06F 11/3608
See application file for complete search history.

(56) References Cited

U.S. PATENT DOCUMENTS

| | | | |
|---|---|---|---|
| 6,425,118 B1 | 7/2002 | Molloy | |
| 8,230,402 B2 | 7/2012 | Chen | |
| 8,533,691 B2 * | 9/2013 | Ben-Artzi | G06F 8/76 717/137 |
| 8,843,908 B2 * | 9/2014 | Hawblitzel | G06F 11/3624 717/146 |
| 9,229,696 B2 * | 1/2016 | Box | G06F 8/437 |
| 9,542,559 B2 * | 1/2017 | Brumley | G06F 21/577 |

(Continued)

FOREIGN PATENT DOCUMENTS

| | | | | |
|---|---|---|---|---|
| CN | 109634869 A | * | 4/2019 | ......... G06F 11/3684 |
| CN | 112286784 A | * | 1/2021 | ......... G06F 11/3684 |

(Continued)

OTHER PUBLICATIONS

CN-112286784-A—English translation.*

(Continued)

*Primary Examiner* — Francisco J Aponte
(74) *Attorney, Agent, or Firm* — Onyx IP Group

(57) ABSTRACT

In some implementations, a code translation validation platform may convert source code, associated with a source application, to an intermediate representation that supports a source programing language and a target programing language. The code translation validation platform may identify metamorphic relations in the intermediate representation based on program constructs and program interactions. The code translation validation platform may generate test cases based on the identified metamorphic relations. The code translation validation platform may perform symbolic execution of the intermediate representation to generated test cases. The code translation validation platform may apply the generated test cases to the source programming language and to the target programming language.

20 Claims, 11 Drawing Sheets

(56) References Cited

U.S. PATENT DOCUMENTS

| | | | |
|---|---|---|---|
| 9,665,350 B1* | 5/2017 | Kalmar | G06F 8/34 |
| 9,804,946 B2 | 10/2017 | Conlon | |
| 9,858,057 B2 | 1/2018 | Venkatasubramanian | |
| 10,102,107 B2 | 10/2018 | Darbha | |
| 10,127,143 B2* | 11/2018 | Hamilton | G06F 11/3684 |
| 10,459,829 B2* | 10/2019 | Sarangapani | G06F 8/43 |
| 11,042,631 B2* | 6/2021 | Ghosh | G06F 21/54 |
| 11,288,173 B1* | 3/2022 | Wang | G06F 16/285 |
| 11,449,410 B2 | 9/2022 | Hong | |
| 11,816,450 B2* | 11/2023 | Katakam | G06F 8/10 |
| 2003/0182653 A1 | 9/2003 | Desoli | |
| 2015/0007148 A1* | 1/2015 | Bartley | G06F 11/368 717/131 |
| 2016/0117239 A1* | 4/2016 | Hamilton | G06F 11/3684 717/124 |
| 2017/0132119 A1* | 5/2017 | Xu | G06F 11/368 |
| 2018/0357145 A1* | 12/2018 | Sarangapani | G06F 11/368 |
| 2019/0102281 A1* | 4/2019 | DeMarco | G06F 11/3688 |
| 2020/0097389 A1* | 3/2020 | Smith | G06F 11/0793 |
| 2021/0318951 A1 | 10/2021 | Gombosh | |
| 2022/0091967 A1* | 3/2022 | Wang | G06F 11/3684 |
| 2022/0261337 A1 | 8/2022 | Arbel | |
| 2022/0374344 A1* | 11/2022 | Brown | G06F 11/3698 |
| 2023/0168985 A1* | 6/2023 | Jardini | G06F 11/263 714/33 |
| 2023/0297491 A1* | 9/2023 | Sariel | G06F 11/366 717/124 |
| 2023/0393964 A1* | 12/2023 | Li | G06F 11/3688 |
| 2025/0004909 A1* | 1/2025 | Pan | G06F 11/3684 |

FOREIGN PATENT DOCUMENTS

| | | | | |
|---|---|---|---|---|
| CN | 113377644 A | | 9/2021 | |
| CN | 112445492 B | * | 3/2024 | G06F 8/425 |
| EP | 2919132 A1 | * | 9/2015 | G06F 11/3604 |
| WO | WO-2024178567 A1 | * | 9/2024 | |

OTHER PUBLICATIONS

CN-109634869-A—English Translation.*
WO-2024178567-A1—English Tranlation.*
Chen, Tsong Y., Shing C. Cheung, and Shiu Ming Yiu. "Metamorphic testing: a new approach for generating next test cases." arXiv preprint arXiv:2002.12543 (2020).*
Parthasarathy, Gaurav, et al. "Towards trustworthy automated program verifiers: Formally validating translations into an intermediate verification language." Proceedings of the ACM on Programming Languages 8.PLDI (2024): 1510-1534.*
Cadar et al., "Klee: Unassisted and Automatic Generation of High-Coverage Tests for Complex Systems Programs." In OSDI, vol. 8, pp. 209-224. 2008.
Chen et al., "Codet: Code Generation with Generated Tests." arXiv preprint arXiv:2207.10397, Nov. 2022, pp. 1-19.
Dolby et al., "Finding Bugs Efficiently with a SAT Solver." In Proceedings of the the 6th joint meeting of the European software engineering conference and the CM SIGSOFT symposium on The foundations of software engineering, 11 pages, 2007.
Kapus et al., "Automatic Testing of Symbolic Execution Engines via Program Generation and Differential Testing," ASE 2017, 32nd IEEE/ACM International Conference on Automated Software Engineering (ASE), pp. 590-600. IEEE, 2017.
Kulal et al., "Spoc: Search-based Pseudocode to Code." Advances in Neural Information Processing Systems 32, arXiv:1906.04908v1, 11 pages. 2019.
Le et al., "Compiler Validation via Equivalence Modulo Inputs." In Proceedings of the 35th Acm Sigplan Conference on Programming Language Design and Implementation, pp. 216-226, 2014.
Lidbury et al., "Many-Core Compiler Fuzzing." In Proceedings of the 36th ACM SIGPLAN Conference on Programming Language Design and Implementation, 12 pages, 2015.
Roziere et al., "Leveraging Automated Unit Tests for Unsupervised Code Translation," Conference Paper, International Conference on Learning Representations, 20 pages, 2022.
Torlak et al., "MemSAT: Checking Axiomatic Specifications of Memory Models." ACM SIGPLAN Notices 45, No. 6, Jun. 2010, pp. 341-350.

* cited by examiner

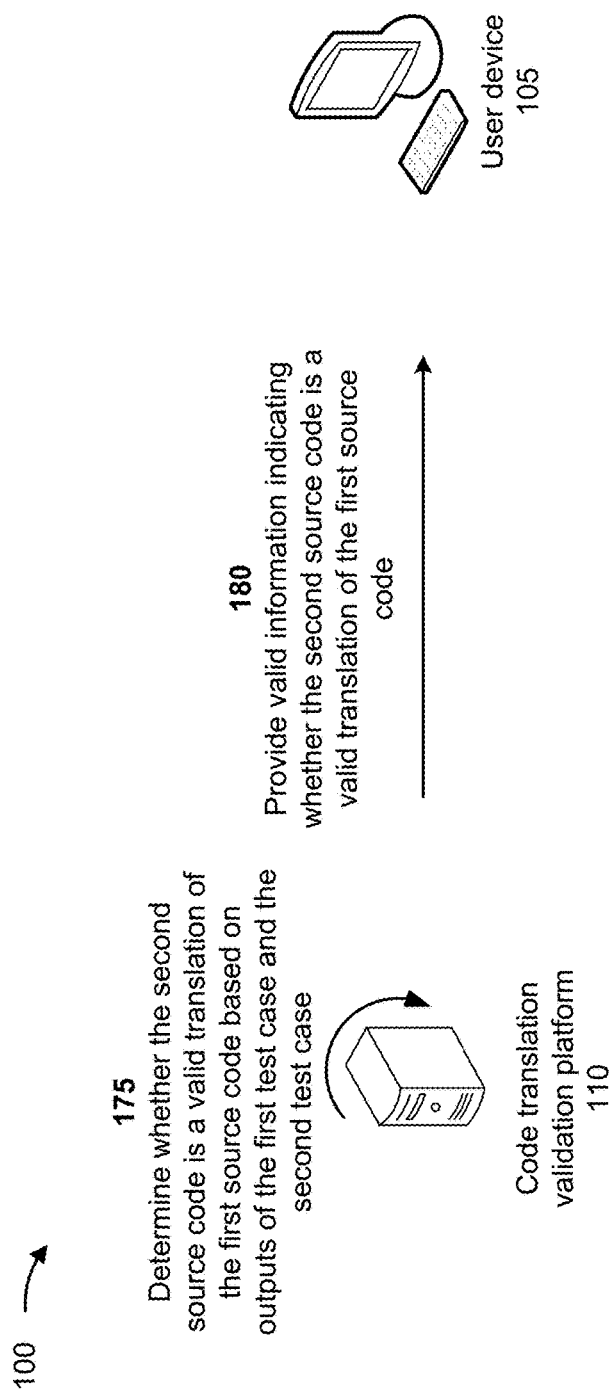

VALIDATION OF CODE TRANSLATION USING INTERMEDIATE REPRESENTATION

BACKGROUND

The present invention relates to the code translation of source code of a source programming language to source code of a target programming language, and more specifically, to validating the code translation using an intermediate representation of the source code. Code translation is an approach where source code, written in a source programming language, is translated to another source code written in a target programming language. In some situations, errors may be introduced during the code translation.

SUMMARY

In some implementations, a method comprising: converting source code, associated with a source application, to an intermediate representation that supports a source programing language and a target programing language; identifying metamorphic relations in the intermediate representation based on program constructs and program interactions; generating test cases based on the identified metamorphic relations; and applying the generated test cases to the source programming language and to the target programming language.

In some implementations, a computer program product comprising: one or more computer readable storage media, and program instructions collectively stored on the one or more computer readable storage media, the program instructions comprising: program instructions to convert a first source code, of a source programing language, to an intermediate representation that supports the source programing language and a target programing language; program instructions to perform an action using the intermediate representation; program instructions to generate test cases based on a result of performing the action; program instructions to apply the generated test cases to the first source code and to a second source code of the target programming language; and program instructions to determine, based on applying the generated test cases, whether the second source code is a valid translation of the first source code.

In some implementations, a system comprising: one or more devices configured to: convert a first source code, of a source programing language, to an intermediate representation that supports the source programing language and a target programing language; generate test cases based on the intermediate representation; apply the generated test cases to the first source code and to a second source code of the target programming language; and determine, based on applying the generated test cases, whether the second source code is a valid translation of the first source code.

BRIEF DESCRIPTION OF THE DRAWINGS

FIGS. 1A-1H are diagrams of an example implementation described herein.

DETAILED DESCRIPTION

Figure 1A:
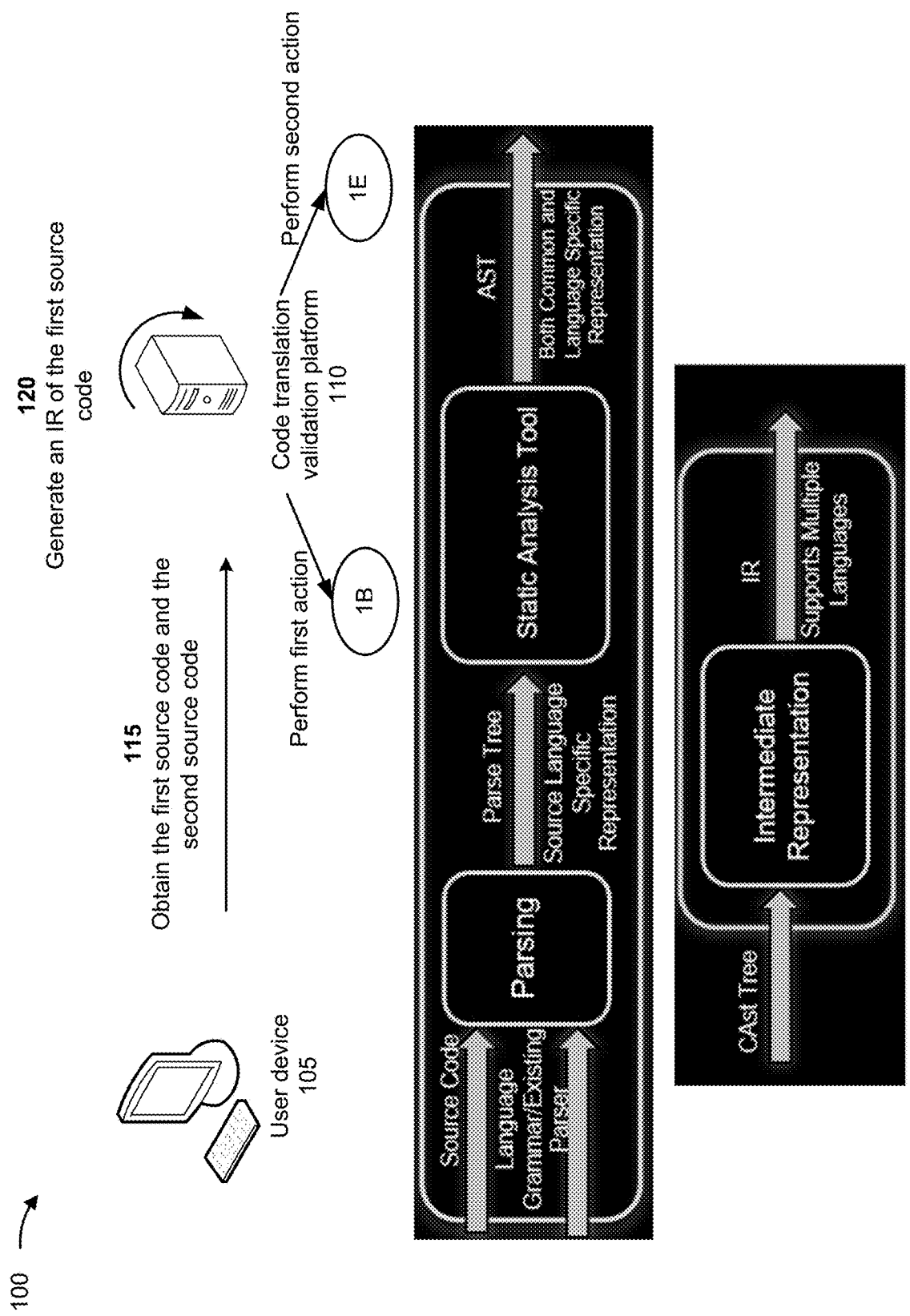

The following detailed description of example implementations refers to the accompanying drawings. The same reference numbers in different drawings may identify the same or similar elements.

An originating source code, written in a source programming language, is translated to target source code written in a target programming language. The target source code is expected to be syntactically and semantically equivalent to the originating source code. In other words, the target source code is expected to include syntaxes and semantics (of the target code programming language) that are similar to syntaxes and semantics (of the source code programming language) included in the originating source code. For example, the syntaxes and semantics (of the target code programming language) are expected to generate outputs that are similar to the syntaxes and semantics (of the source code programming language).

In this regard, test cases may be generated to determine whether the targeted source code is syntactically and semantically equivalent to the originating source code. Generating the test cases may be achieved by symbolic execution of the originating source code and of the target source code and by using a constraint solver to generate test data for the test cases.

Generating the test cases and generating the test data is heavily dependent on the capability of a computing device performing the symbolic execution on the originating source code language. Additionally, generating the test cases and generating the test data is heavily dependent on the capability of the computing device performing the symbolic execution on the terminating source code language. Additionally, generating the test cases and generating the test data is heavily dependent on the capability of the computing device implementing the constraint solver.

Symbolic execution may refer to executing a program using symbolic values as inputs to the program, instead of using actual values as inputs. Symbolic execution may be used to execute the program abstractly, such that an abstract execution of the program covers multiple inputs to the program. A constraint solver may refer to an analysis tool that is used to solve constraints specified by a program.

The symbolic execution and the constraint solver may require a significant amount of time and, accordingly, may consume a significant amount of computing resources, a significant amount of network resources, and/or a significant amount of storage resources. In this regard, the computing device may be unable to perform the symbolic execution and implement the constraint solver if performing the symbolic execution and/or implementing the constraint solver exceeds the computing resources, the network resources, and/or the storage resources of the computing device.

In some examples, code translation may be validated by executing existing test cases on the originating source code and the target source and/or by generating new test cases (using a computing device) for validating the code translation. Existing tests are subject to disadvantages that include the existing tests generally being limited in their programming language scope. For example, the existing test cases may be executed on a limited number of programming languages and/or may be applicable to limited syntaxes and/or limited semantics of programming languages.

Generating new test cases is subject to a disadvantage that include the requirement for the availability of static and dynamic program analysis tools for each new test. Generating new test cases is subject to another disadvantage that includes the source programming language being a proprietary programming language that is not commonly used. Generating new test cases is subject to yet another disadvantage that includes the requirement for a new test case to be generated for each source programming language.

Generating new test cases in this manner is time-consuming and is subject to human errors. Accordingly, generating new test cases in this manner consume computing resources associated with troubleshooting the human errors, consume network resources associated with troubleshooting the human errors, and/or consume storage resources for storing data associated with troubleshooting the human errors.

Implementations described herein provide solutions to overcome the above issues relating to validating code translation. For instance, implementations described herein may validate code translation by generating an intermediate representation (IR) of a first source code in a first programming language. The IR of the first source code generated may support multiple programming languages. Because of this support of multiple programming languages, the IR may be used to determine whether a second source code, in a second programming language, is a valid translation of the first source code. In this regard, validating code translation may ensure that the second source code is a valid translation of the first source code.

In some examples, implementations described herein may generate test cases for the IR to validate the code translation. The test cases will be generated for the IR by applying metamorphic testing on the IR. Alternatively, implementations described herein may generate test cases on the IR using static symbolic analysis approach on the IR.

With respect to generating the test cases by applying metamorphic testing, instead of symbolically executing a program, one or more metamorphic relations may be identified for the IR of the first source code. The identified one or more metamorphic relations may be used to generate test cases. The test cases may be used to determine whether the second source code is syntactically equivalent and/or semantically equivalent to the first source code. Identifying the one or more metamorphic relations for the IR may preserve computing resources, network resources, and storage resources that would have been to identify metamorphic relations for the first source code and for the second source code.

The test cases may not require an exhaustive search for all the symbolic paths of the IR and may not use constraint solver to generate test data. The test cases will be applied to the first source code and the second source code. In this regard, a failure of the test cases, when applied to the second source code, may indicate that the second source code is not a valid translation of the first source code.

With respect to generating test cases on the IR, a symbolic test case generation approach may be used to generate the test cases. In this regard, the statements in the IR will be converted into corresponding symbolic representations. The symbolic representations may preserve computing resources, network resources, and/or storage resources that would have been used to identify and utilize multiple actual input values during the actual execution of the IR. Implementations described herein may use a constraint solver to generate test data for the test cases.

The test cases generated on the IR may be converted to the first programming language and applied on the first source code to generate first results and may be converted to the second programming language and applied on the second source code to generate second results. In this regard, the first results and the second results may be compared to determine a difference between the first results and the second results and the difference may indicate that the second source code is not a valid translation of the first source code.

By validating the code translation, implementations described herein may reduce the amount of time typically spent on validating the code translation or on writing the full validating test cases for the code translation. Additionally, or alternatively, implementations described herein may prevent human error from being introduced during the code translation. Accordingly, implementations described herein preserve computing resources, network resources, and storage resources that would have been used to troubleshoot the second source code, troubleshoot the host device hosting the second source code, repair the host device, and/or reconfigure the host device, among other examples.

For example, by validating the code translation as described herein, implementations described herein preserve computing cycles that would have been used to troubleshoot the second source code and/or the host device, network bandwidth that would have been used to troubleshoot the second source code and/or the host device, and storage resources that would have been used to store data used to troubleshoot the second source code and/or the host device.

FIGS. 1A-1H are diagrams of an example implementation 100 described herein. As shown in FIGS. 1A-1H, example implementation 100 includes a user device 105 and a code translation validation platform 110. These devices are described in more detail below in connection with FIG. 3.

User device 105 and code translation validation platform 110 may be connected via wired connections, wireless connections, or a combination of wired and wireless connections. The devices may be connected via a network that includes one or more wired and/or wireless networks. For example, the network may include Ethernet switches. Additionally, or alternatively, the network may include a cellular network, a public land mobile network (PLMN), a local area network (LAN), a wide area network (WAN), a private network, the Internet, and/or a combination of these or other types of networks. The network enables communication between user device 105, code translation validation platform 110, and/or one or more additional devices associated with code translation validation platform 110.

User device 105 may include one or more devices configured to receive, generate, store, process, and/or provide information associated with code translation validation, as explained herein. User device 105 may be used to develop a first source code in a source programming language and/or develop a second source code in a target programming language. The source programming language may be different than the target programming language.

The second source code may be a translation of the first source code. For example, the second source code may be developed by way of code translation. The second source code may be developed with the intent of being syntactically and semantically equivalent to the first source code.

User device 105 may include a communication device and a computing device. For example, user device 105 may include a wireless communication device, a mobile phone, a user equipment, a laptop computer, a tablet computer, a desktop computer, or a similar type of device.

Code translation validation platform 110 may include one or more devices configured to receive, generate, store, process, and/or provide information associated with validating the second source code, as explained herein. In other words, code translation validation platform 110 may be configured to determine whether the second source code is a valid translation of the first source code. For example, code translation validation platform 110 may be configured to analyze the second source code to determine whether the second source code is syntactically and semantically equivalent to the first source code.

As shown in FIG. 1A, and by reference number 115, code translation validation platform 110 may obtain the first source code and the second source code. In some implementations, user device 105 may provide the first source code and the second source code. Additionally, or alternatively, user device 105 may provide a request to determine whether the second source code is a valid translation of the first source code.

In some implementations, code translation validation platform 110 may obtain the first source code and/or the second source code from a repository of source codes. For example, code translation validation platform 110 may obtain the first source code and the second source code from the repository of source codes based on the request to determine whether the second source code is a valid translation of the first source code.

In some implementations, code translation validation platform 110 may obtain the first source code and/or the second source code based on a trigger. As an example, the trigger may be the request from user device 105. For instance, code translation validation platform 110 may receive the request from user device 105 and may include information identifying the first source code and the second source code (e.g., information that may be used to perform a lookup of the repository of source codes). Additionally, or alternatively, the trigger may be an indication that the first source code and the second source code has been received by the repository of source codes.

In some implementations, code translation validation platform 110 may obtain the first source code and the second source code periodically (e.g., every hour, every four hours, every day, among other examples). For example, code translation validation platform 110 may search the repository of source codes periodically to identify new source code that has been received by the repository of source codes.

As shown in FIG. 1A, and by reference number 120, code translation validation platform 110 may generate an IR of the first source code. For example, the IR may be a data structure or code that supports the first source code and the second source code. In some implementations, code translation validation platform 110 may generate the IR using one or more IR algorithms. For example, code translation validation platform 110 may generate the IR using a single static assignment form.

As shown in FIG. 1A, for example, generating the IR may include parsing the first source and the language grammar of the source programming language. To parse the first source code, code translation validation platform 110 may either take the first source code as a text input or may compile the first source code to an intermediate form (e.g., bytecode). The text input or the intermediate form may be parsed. In some examples, the language grammar may be parsed by various parser generators or parser generating tools, such as another tool for language recognition.

As shown in FIG. 1A, a parse tree may be generated as a result of parsing the first source and the language grammar. The parse tree may be a tree-based representation of the language grammar after the first source code has been parsed (e.g., after processing the input code). For example, the parse tree may be a source programming language specific representation.

Based on the parse tree, a more language agnostic representation may be generated. For example, an abstract syntax tree (AST) representation may be generated based on the parse tree. In some examples, the AST representation may be generated using a static analysis tool. Because the goal is to generate code that supports multiple target programming languages, the parse tree (generated based on the first source code) may be converted into more language agnostic representation. In this conversion step, the context, data flow, and control flow information of the AST representation may be stored and subsequently used while generating the IR.

As shown FIG. 1A, the AST representation may be converted into the IR. As explained herein, the IR may be a data structure or code that supports the first source code and the second source code.

As shown in FIG. 1A, code translation validation platform 110 may perform a first action using the IR or perform a second action using the IR. For example, code translation validation platform 110 may identify metamorphic relations in the IR and determine whether the second source code is a valid translation of the first source code based on the metamorphic relations. Alternatively, code translation validation platform 110 may perform symbolic execution on the IR and determine whether the second source code is a valid translation of the first source code based on performing the symbolic execution.

Figure 1B:
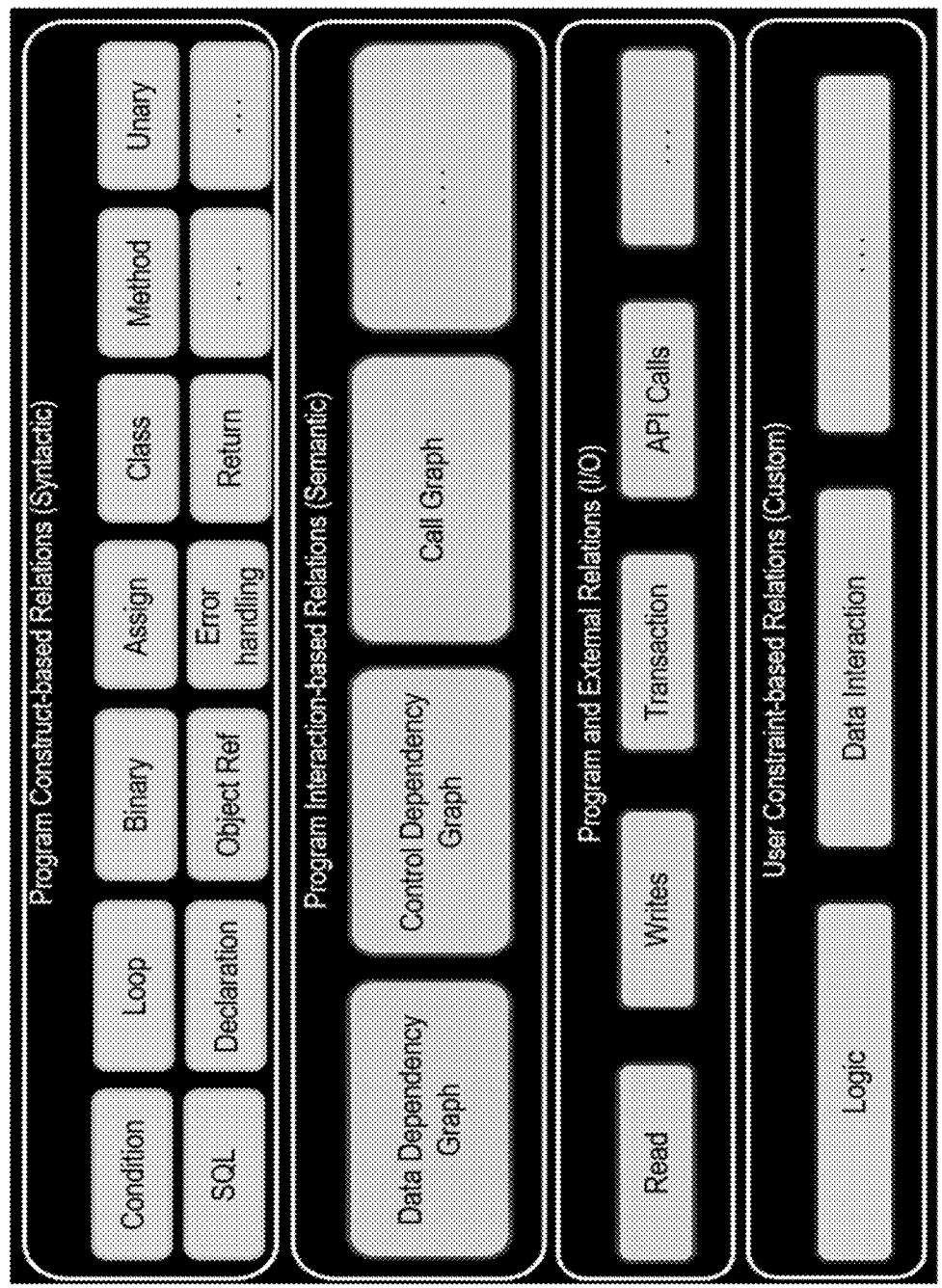
Figure 1B:
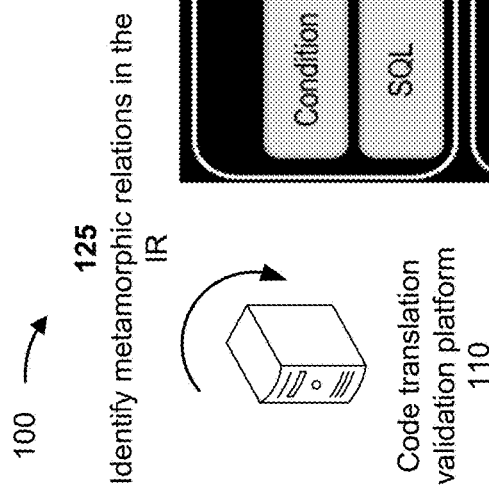

As shown in FIG. 1B, and by reference number 125, code translation validation platform 110 may identify metamorphic relations in the IR. For example, when identifying the metamorphic relations, code translation validation platform 110 may solve the following: given a program $P_S$ written in the source programming language S, identify the set of relations $\mathbb{R}$, which can help to expose the bugs in the translated program $P_T$ written in the source programming language T. In this regard, code translation validation platform 110 may identify the metamorphic relations that are to be included in the set of relations $\mathbb{R}$.

As shown in FIG. 1B, for example, the metamorphic relations may include program construct-based relations, program interaction-based relations, program and external relations, and user constraint-based relations. The program construct-based relations may identify metamorphic relations that are based on program constructs of the source programming language and/or are based on syntaxes of the source programming language. For example, the program construct-based relations may be used to determine whether the second source code is syntactically correct.

The program interaction-based relations may identify metamorphic relations that are based on semantics of the source programming language. For example, the program interaction-based relations may be used to determine whether the second source code is semantically correct. The program interaction-based relations may identify program relations such as data dependency graph, control dependency graph, call graph, among other examples.

The program and external relations may identify metamorphic relations that are based on input and output operations of the source programming language. For example, the program and external relations may identify metamorphic relations that are based on read operations, write operations, transactions, application programming interface calls, among other examples. The program interaction-based relations may identify program relations such as data dependency graph, control dependency graph, call graph, among other examples.

The user constraint-based relations may identify metamorphic relations that are defined by a user and that are related to logic, data interaction, among other examples. For instance, for a program that can perform sorting, the metamorphic relation may be based on the functionality for performing the sorting. The user can define the relation that, for given an input, the output data will have a list of item, where the relation between two consecutive element is some binary relation.

With respect to identifying the program construct-based relations, code translation validation platform 110 may identify all the program constructs for the source programming language, components that are needed to build the program constructs, and identify components that are optional to build the program constructs. As shown in FIG. 1B, the program constructs may include condition statements, loops, binary, assignments, structured query statements, among other examples.

As an example, a conditional statement may include multiple components, such as a conditional clause, a then-clause, an else-clause, and an else-if clause. The first two components may be required while the last two components may be optional. Once the program constructs, the components, and the requirements have been identified, code translation validation platform 110 may build the metamorphic relations.

A program $P_S$, written in the source programming language S, may include several program constructs PC={CS, LS, BS, AS, . . . }, where CS is the conditional statement. If the program has been translated to $P_T$, written in the target programming language T, the set of constructs will be the same (if there is no optimization) but translated to the target programming language. So, we can assume that if there is no optimization/removal of any program constructs, then these two programs should have equivalent program constructs and components. The metamorphic relation can be formalized as follows:

$P_S$(Condition, {ConditionalClause, Then, Else, Elseif}) ≡$P_T$(Condition, {ConditionalClause, Then, Else, Elseif}).

With respect to identifying the program interaction-based relations, code translation validation platform 110 may identify all the program interactions, such as data dependency graph, control dependency graph, call graph, among other examples. Code translation validation platform 110 may determine the metamorphic relation based on the program interaction dependency.

As an example, variable $V_{SA}$ is connected to $V_{SB}$ using def-use relation in program PS, written in the source programming language S. If the program has been translated to the target programming language T, then the translated program $P_T$ should have a def-use relation between the two translated variables, $V_{TA}$ and $V_{TA}$. The metamorphic relation can be formalized as:

$P_S$ ($V_{SA}$, $V_{SB}$)≡$P_T$ ($V_{TA}$, $V_{TB}$).

Figure 1C:
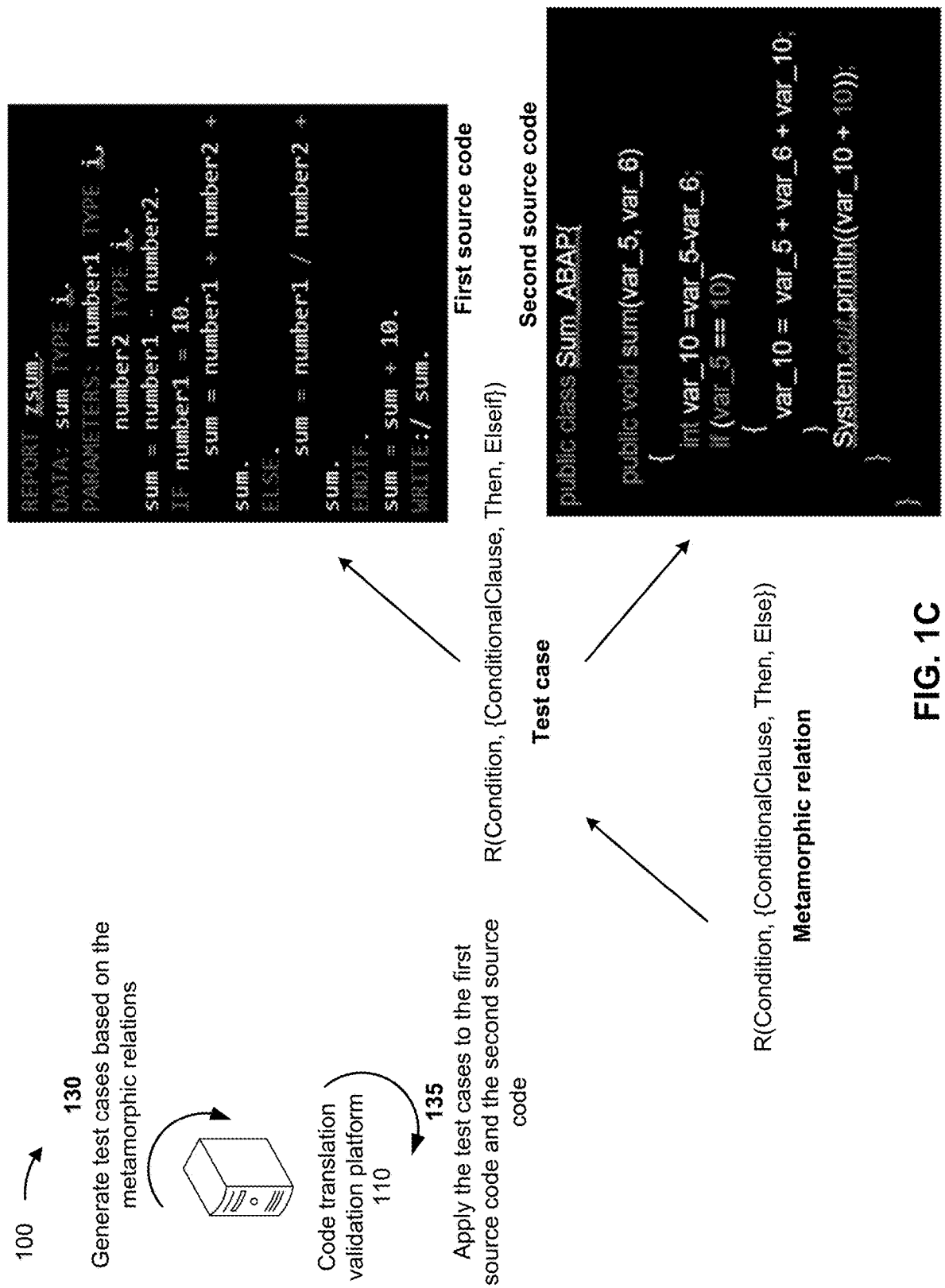

As shown in FIG. 1C, and by reference number 130, code translation validation platform 110 may generate test cases based on the metamorphic relations. For example, based on the program construct-based relations, code translation validation platform 110 may generate test cases to determine whether the first source code is syntactically equivalent to the second source code (e.g., determine whether the program constructs of the first source code are equivalent to the program constructs of the second source code).

Additionally, or alternatively, based on the program interaction-based relations, code translation validation platform 110 may generate test cases to determine whether the first source code is semantically equivalent to the second source code (e.g., determine whether the variable dependencies of the first source code are equivalent to the variable dependencies of the second source code). Additionally, or alternatively, based on the program and external relations, code translation validation platform 110 may generate test cases to determine whether the input and output operations of the first source code are equivalent to the input and output operations of the second source code.

As shown in FIG. 1C, with respect to the program construct-based relations, code translation validation platform 110 may generate test cases to validate the program constructs of the second source code. The first source code may include a conditional statement that include multiple components, such as a conditional clause, a then-clause, an else-clause, and an else-if clause. The second source code may not include an else-if clause. In this example, for the condition statement, the "elseif" component has not been translated to the second source code of the target programming language. In such cases, the metamorphic relation built using the program constructs and the components may be used to validate the code translation logic.

The metamorphic relation may be as follows:
R(Condition, {ConditionalClause, Then, Else}).
Based on the metamorphic relation, a test case may be generated as follows:
R(Condition, {ConditionalClause, Then, Elseif}).
The test case may be generated to validate the code translation logic. Similarly, with respect to the program interaction-based relations, code translation validation platform 110 may generate test cases to validate the dependencies of variables of the second source code.

As shown in FIG. 1C, and by reference number 135, code translation validation platform 110 may apply the test cases to the first source code and the second source code. For example, code translation validation platform 110 may apply the test cases to the first source code and the second source code to determine whether the second source code is a valid translation of the first source code. For instance, code translation validation platform 110 may apply the test cases, generated based on the program construct-based relations, to determine whether the first source code is syntactically equivalent to the second source code.

Additionally, or alternatively, code translation validation platform 110 may apply the test cases, generated based on the program interaction-based relations, to determine whether the first source code is semantically equivalent to the second source code; code translation validation platform 110 may apply the test cases, generated based on the program and external relations, to determine whether the input and output operations of the first source code are equivalent to the input and output operations of the second source code; and so on.

Figure 1D:
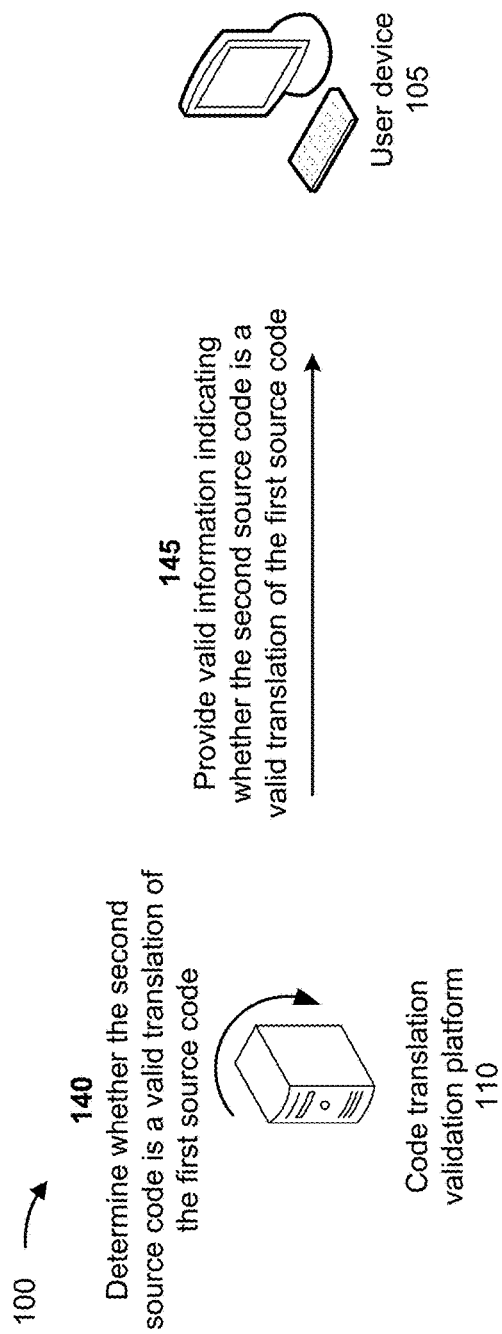

As shown in FIG. 1D, and by reference number 140, code translation validation platform 110 may determine whether the second source code is a valid translation of the first source code. For example, based on applying the test cases to the first source code and to the second source code, code translation validation platform 110 may determine whether the second source code is a valid translation of the first source code. In some implementations, a failure resulting from applying the test cases to the second source code may indicate that the second source code is not a valid translation of the first source code. Alternatively, a success resulting from applying the test cases to the first source code may indicate that the second source code is a valid translation of the first source code.

With respect to the test cases generated based on the program construct-based relations, a failure may result from applying the test cases to the second source code because the second source does not include an elseif clause. Similarly, with respect to the test cases generated based on the program interaction-based relations, a failure may result from applying the test cases to the second source code if the second source does not include the variable dependency of the first source code and/or if the second source code different variable dependency than the variable dependency between two variables of the first source code.

As shown in FIG. 1D, and by reference number 145, code translation validation platform 110 may provide validation information indicating whether the second source code is a valid translation of the first source code. For example, code translation validation platform 110 may provide the validation information to user device 105.

Figure 1E:
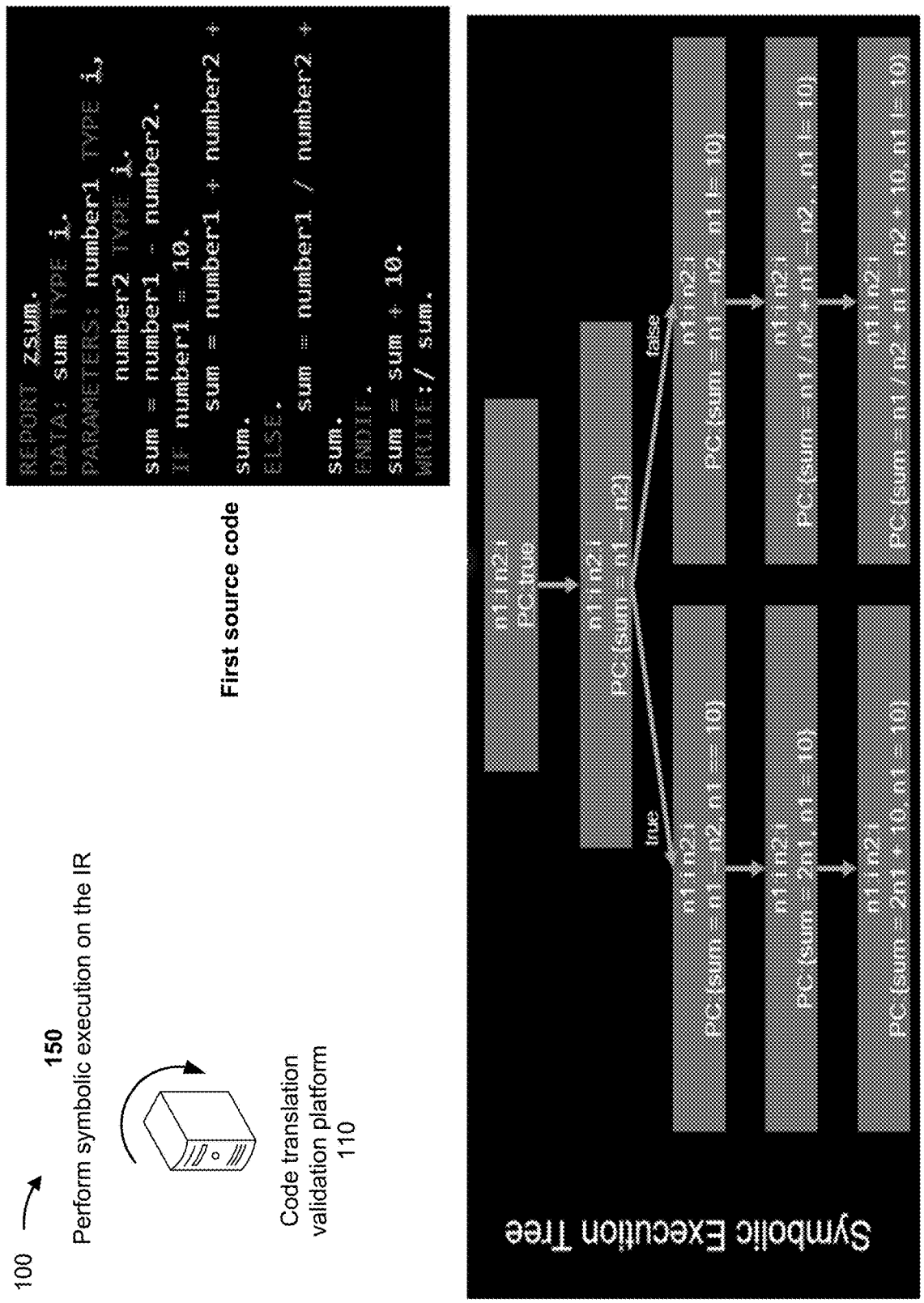

As shown in FIG. 1E, and by reference number 150, code translation validation platform 110 may perform symbolic execution on the IR. For example, instead of performing the symbolic execution on the first source code and on the second source code, code translation validation platform 110 may perform the symbolic execution on the IR. When performing the symbolic execution, instead of actual inputs, program variables will be represented in symbolic expressions while maintaining the path conditions of the first source code (or the program represented by the IR). In other words, code translation validation platform 110 may use symbolic values for the execution of the IR.

In some examples, code translation validation platform 110 may include an execution engine that steps through the program and converts values based on the operation of the program. For instance, code translation validation platform 110 (e.g., the execution engine) may evaluate the expressions in the program and evaluate the effects assigned to input variables of the program.

By performing the symbolic execution on the IR, code translation validation platform 110 may identify various program paths. In this regard, code translation validation platform 110 may obtain the pre-conditions that satisfies each path. A pre-condition may refer to a condition that is to be true in order for an action, associated with the pre-condition, to be executed. As part of the symbolic execution, code translation validation platform 110 (e.g., the execution engine) may proceed down different paths and generate constraints at the end of each path. As shown in FIG. 1E, the program may include a conditional statement ("IF number1=10"). In this regard, code translation validation platform 110 may proceed down a first path associated with the conditional statement being true and may proceed down a second path associated with the conditional statement being false.

Figure 1F:
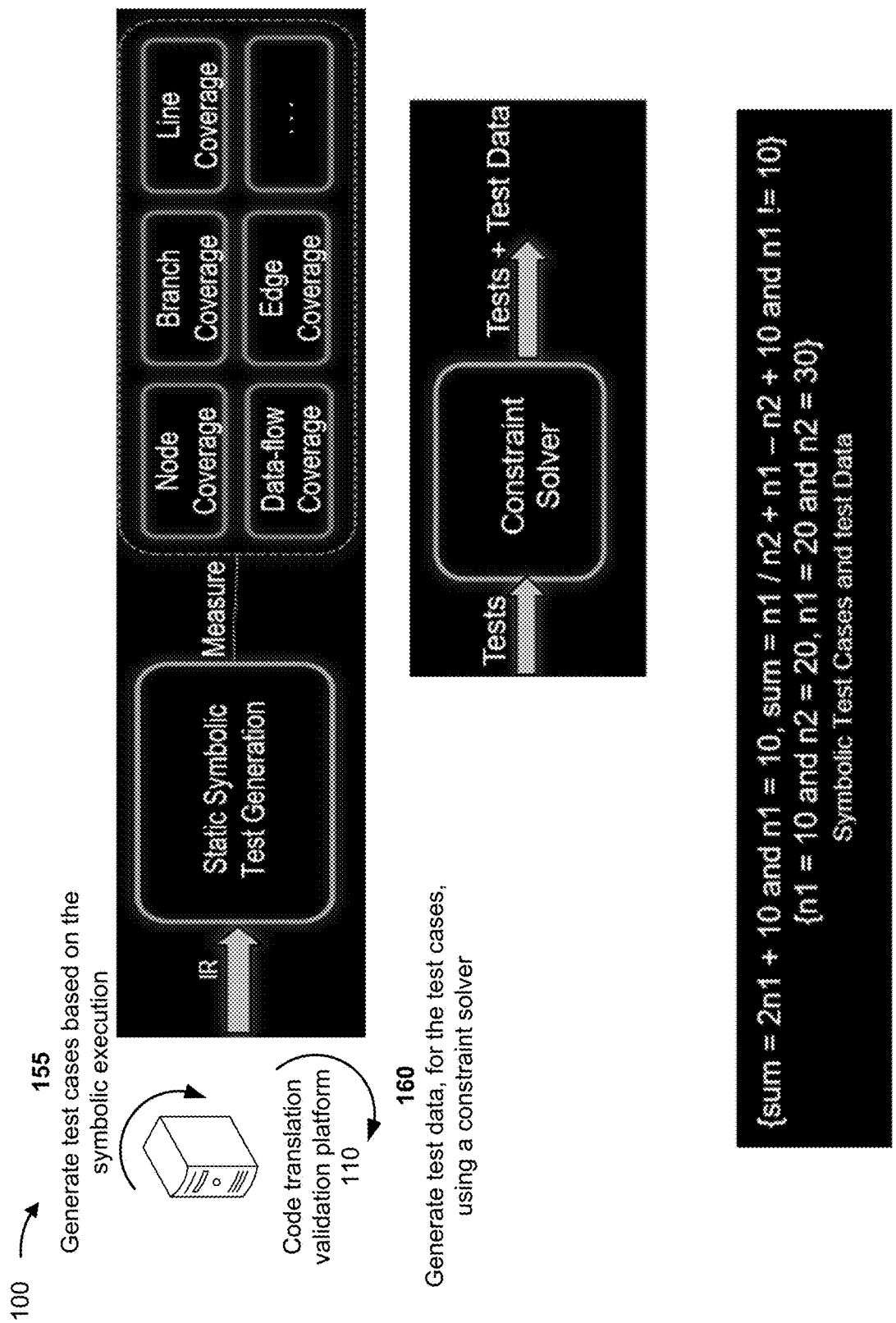

As shown in FIG. 1F, and by reference number 155, code translation validation platform 110 may generate test cases based on the symbolic execution. For example, code translation validation platform 110 may generate test cases on the IR based on performing the symbolic execution. In some implementations, in order to generate the test cases, code translation validation platform 110 may use a symbolic test case generation approach (e.g., a static symbolic analysis approach). Using the symbolic test case generation approach, the statements in the IR may be converted into corresponding symbolic representations and that may be used to generate the test cases.

In some implementations, code translation validation platform 110 may generate test cases based on an outcome of each path. For example, as shown in FIG. 1E, code translation validation platform 110 may generate a first test case based on a first outcome of the first path. For instance, the first test case may be as follows: sum=2n1+10 and n1=10. Additionally, code translation validation platform 110 may generate a second test case based on a second outcome of the second path. For instance, the second test case may be as follows: sum=n1/n2+n1−n2+10 and n1 !=10.

In some implementations, code translation validation platform 110 may generate the test cases using symbolic test generation. With the symbolic test generation, code translation validation platform 110 may test the IR based on various testing coverage criteria. For example, code translation validation platform 110 may test the IR with respect to node coverage, branch coverage, line coverage, data-flow coverage, and/or edge coverage, among other examples.

As shown in FIG. 1F, and by reference number 160, code translation validation platform 110 may generate test data, for the test cases, using a constraint solver. For example, the test cases are generated, code translation validation platform 110 generate the test data using a constraint solver. In some implementations, code translation validation platform 110 may include the constraint solver. Code translation validation platform 110 (e.g., the constraint solver) may use the test cases to generate test data. Code translation validation platform 110 may generate the test data by solving constraints associated with the test cases.

As shown in FIG. 1F, for example, by solving the constraints associated with the first test case (sum=2n1+10 and n1=10), code translation validation platform 110 may generate test data as follows n1=10 and n2=20. Additionally, by solving the constraints associated with the second test case (sum=n1/n2+n1−n2+10 and n1 !=10), code translation validation platform 110 may generate test data as follows n1=20 and n2=30.

Figure 1G:
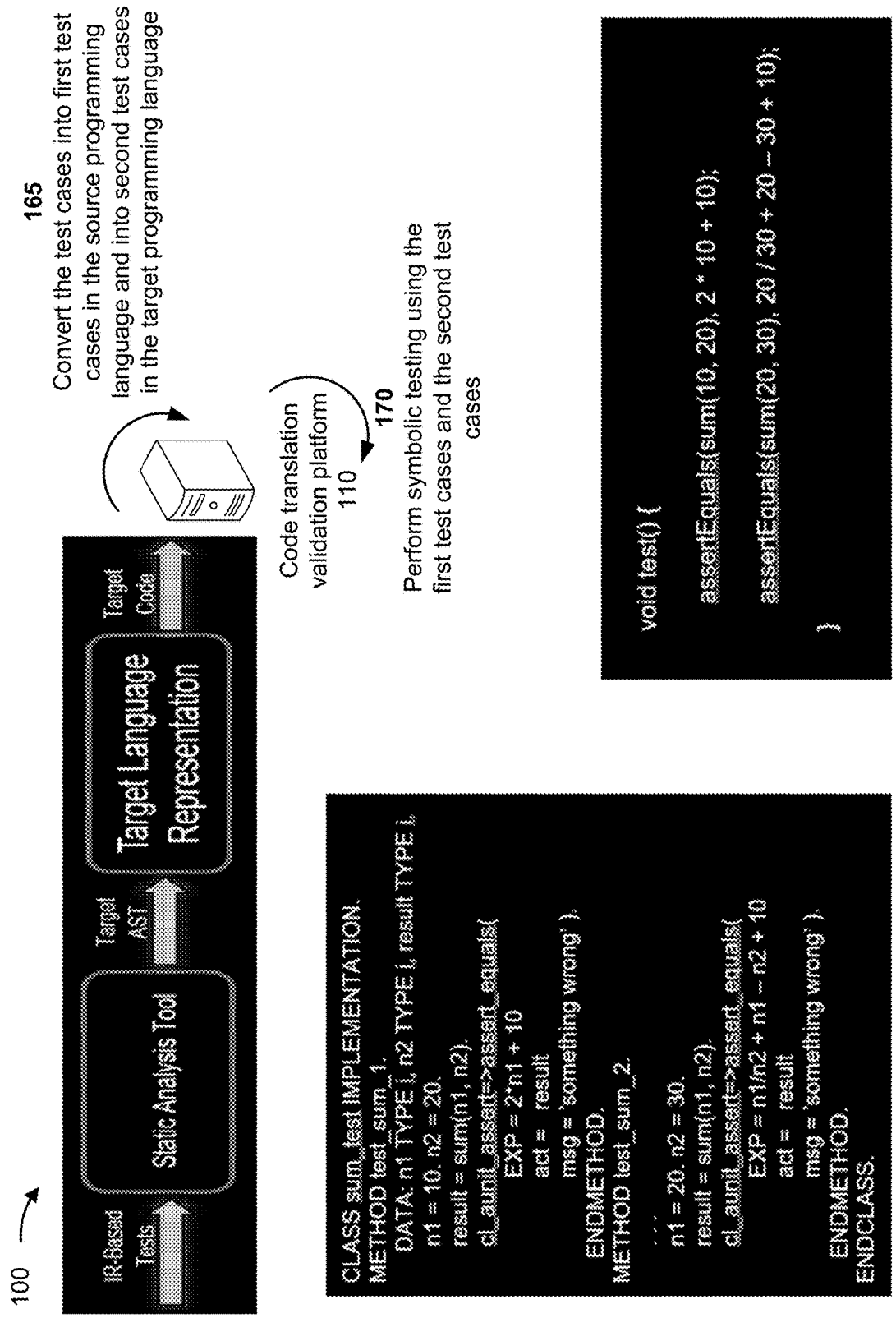

As shown in FIG. 1G, and by reference number 165, code translation validation platform 110 may convert the test cases generated on the IR into first test cases in the source programming language and into second test cases in the target programming language.

The test cases may be converted by directly taking the source programming language and generating source code written in the target programming language using various AI-based approach. In this regard, code translation validation platform 110 may implement the IR to target code generation approach. Alternatively, the test cases may be converted into an additional intermediate representation and the additional intermediate representation may be converted into the target programming language. In this regard, code translation validation platform 110 may use the existing translation logic.

For the IR to target code generation, code translation validation platform 110 may convert the IR into an AST format using a static analysis tool, in a manner similar to the manner described above with respect to generating the IR. Each instruction in the IR may be analyzed and a corresponding AST representation may be generated. Because, the AST representation is programming language dependent, code translation validation platform 110 may generate a modified AST, which will represent the common part of the AST nodes and leave the language specific portions as an abstract definition.

Based on the target programming language, the language specific portions may be implemented in subsequent steps to generate the code in the target programming language. Code translation validation platform 110 may convert the AST generated from the IR into source code in the target programming language. We will visit each node type in the AST and convert each node type into code written in the source programming language and the target programming language.

As shown in FIG. 1G, and by reference number 170, code translation validation platform 110 may perform testing using the first test cases and the second test cases. For example, code translation validation platform 110 may cause the first test cases and the second test cases to be executed in two different environments and verify whether the translated code works properly. For instance, differential testing will be applied on the test cases translated to the source programming language and the target programming language.

As a result of the differential testing, code translation validation platform 110 may determine whether the second source code is a validation translation of the first source code. For example, code translation validation platform 110 may determine whether the second source code is a validation translation of the first source code if the outputs of the first test cases is same as the outputs of the second test cases. As shown in FIG. 1G, for example, by executing the second test cases on the second source code, code translation validation platform 110 may identify that the conditional clause in the "if" statement has been translated incorrectly. In this regard, executing the second test cases on the target source code may yield different results. Accordingly, code translation validation platform 110 may determine that the second source code is not a valid translation of the first source code.

As shown in FIG. 1H, and by reference number 175, code translation validation platform 110 may determine whether the second source code is a valid translation of the first source code based on the outputs of the first test cases and the outputs of the second test cases. For example, code translation validation platform 110 may determine that the second source code is a valid translation of the first source code if the outputs of the first test cases and the outputs of the second test cases are same. Alternatively, code translation validation platform 110 may determine that the second source code is not a valid translation of the first source code if the outputs of the first test cases and the outputs of the second test cases are different.

As shown in FIG. 1H, and by reference number 180, code translation validation platform 110 may provide validation information indicating whether the second source code is a valid translation of the first source code.

Implementations described herein may validate code translation by performing metamorphic testing on the IR. The metamorphic testing may be performed by applying test cases generated based on metamorphic relations identified in the IR. The test cases may be applied to the first source code and to the second source.

Additionally, or alternatively, implementations described herein may validate the code translation by performing symbolic execution on the IR. Based on the symbolic execution, test cases and test data may be generated. The test cases may be translated to test cases in the source programming language and to test cases in the target programming language. The translated test cases may be applied to the first source code and to the second source code to determine whether the second source code is a valid translation of the first source code.

In some implementations, the second source code may be utilized in a production system. For example, the second source code may replace the first source code in the production system. For instance, the second source code may replace the first source code if the second source code is a valid translation of the first source code, if the generated test cases exceed a threshold, among other examples.

By validating the code translation, implementations described herein may reduce the amount of time typically spent on validating the code translation. Additionally, or alternatively, implementations described herein may prevent human error from being introduced during the code translation. Accordingly, implementations described herein preserve computing resources, network resources, and storage resources that would have been used to troubleshoot the second source code, troubleshoot the host device hosting the second source code, repair the host device, and/or reconfigure the host device, among other examples.

For example, implementations described herein preserve computing cycles that would have been used to troubleshoot the second source code and/or the host device, network bandwidth that would have been used to troubleshoot the second source code and/or the host device, and storage resources that would have been used to store data used to troubleshoot the second source code and/or the host device.

As indicated above, FIGS. 1A-1H are provided as an example. Other examples may differ from what is described with regard to FIGS. 1A-1H. The number and arrangement of devices shown in FIGS. 1A-1H are provided as an example. A network, formed by the devices shown in FIGS. 1A-1H may be part of a network that comprises various configurations and uses various protocols including local Ethernet networks, private networks using communication protocols proprietary to one or more companies, cellular and wireless networks (e.g., Wi-Fi), instant messaging, Hypertext Transfer Protocol (HTTP) and simple mail transfer protocol (SMTP), and various combinations of the foregoing.

There may be additional devices (e.g., a large number of devices), fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
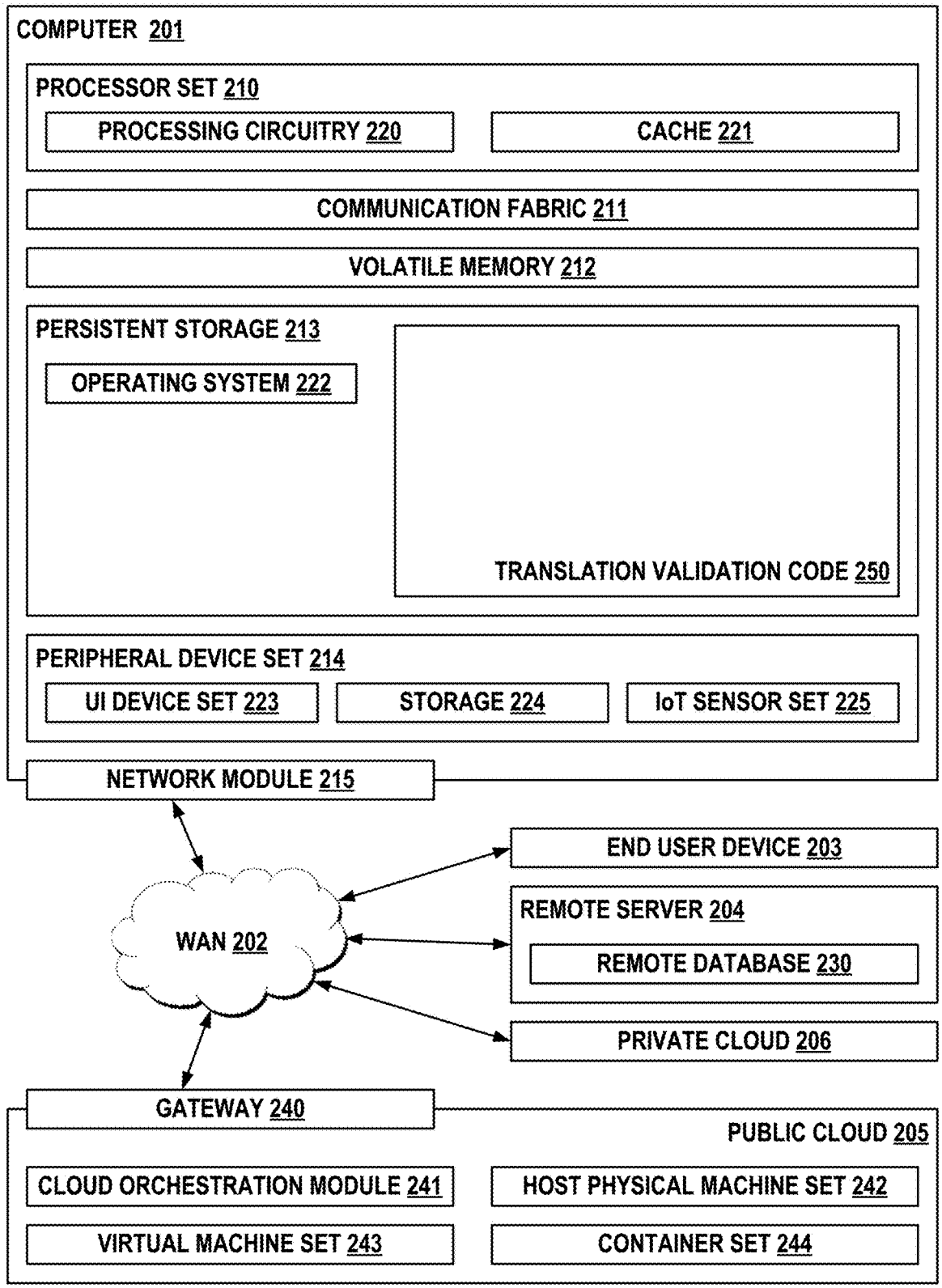
FIG. 2 is a diagram of an example computing environment in which systems and/or methods described herein may be implemented.

FIG. 2 is a diagram of an example computing environment 200 in which systems and/or methods described herein may be implemented. Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 200 contains an example of an environment for the execution of at least some of the computer code involved in performing the inventive methods, such as translation validation code 250. In addition to block 250, computing environment 200 includes, for example, computer 201, wide area network (WAN) 202, end user device (EUD) 203, remote server 204, public cloud 205, and private cloud 206. In this embodiment, computer 201 includes processor set 210 (including processing circuitry 220 and cache 221), communication fabric 211, volatile memory 212, persistent storage 213 (including operating system 222 and block 250, as identified above), peripheral device set 214 (including user interface (UI) device set 223, storage 224, and Internet of Things (IoT) sensor set 225), and network module 215. Remote server 204 includes remote database 230. Public cloud 205 includes gateway 240, cloud orchestration module 241, host physical machine set 242, virtual machine set 243, and container set 244.

COMPUTER 201 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 230. As is well understood in the art of computer technology, and depending upon the technology, performance of a computer-implemented method may be distributed among multiple computers and/or between multiple locations. On the other hand, in this presentation of computing environment 200, detailed discussion is focused on a single computer, specifically computer 201, to keep the presentation as simple as possible. Computer 201 may be located in a cloud, even though it is not shown in a cloud in FIG. 2. On the other hand, computer 201 is not required to be in a cloud except to any extent as may be affirmatively indicated.

PROCESSOR SET 210 includes one, or more, computer processors of any type now known or to be developed in the future. Processing circuitry 220 may be distributed over multiple packages, for example, multiple, coordinated integrated circuit chips. Processing circuitry 220 may implement multiple processor threads and/or multiple processor cores. Cache 221 is memory that is located in the processor chip package(s) and is typically used for data or code that should be available for rapid access by the threads or cores running on processor set 210. Cache memories are typically organized into multiple levels depending upon relative proximity to the processing circuitry. Alternatively, some, or all, of the cache for the processor set may be located "off chip." In some computing environments, processor set 210 may be designed for working with qubits and performing quantum computing.

Computer readable program instructions are typically loaded onto computer 201 to cause a series of operational steps to be performed by processor set 210 of computer 201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 221 and the other storage media discussed below. The program instructions, and associated data, are accessed by processor set 210 to control and direct performance of the inventive methods. In computing environment 200, at least some of the instructions for performing the inventive methods may be stored in block 250 in persistent storage 213.

COMMUNICATION FABRIC 211 is the signal conduction path that allows the various components of computer 201 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 212 is any type of volatile memory now known or to be developed in the future. Examples include dynamic type random access memory (RAM) or static type RAM. Typically, volatile memory 212 is characterized by random access, but this is not required unless affirmatively indicated. In computer 201, the volatile memory 212 is located in a single package and is internal to computer 201, but, alternatively or additionally, the volatile memory may be distributed over multiple packages and/or located externally with respect to computer 201.

PERSISTENT STORAGE 213 is any form of non-volatile storage for computers that is now known or to be developed in the future. The non-volatility of this storage means that the stored data is maintained regardless of whether power is being supplied to computer 201 and/or directly to persistent storage 213. Persistent storage 213 may be a read only memory (ROM), but typically at least a portion of the persistent storage allows writing of data, deletion of data and re-writing of data. Some familiar forms of persistent storage include magnetic disks and solid state storage devices. Operating system 222 may take several forms, such as various known proprietary operating systems or open source Portable Operating System Interface-type operating systems that employ a kernel. The code included in block 250 typically includes at least some of the computer code involved in performing the inventive methods.

PERIPHERAL DEVICE SET 214 includes the set of peripheral devices of computer 201. Data communication connections between the peripheral devices and the other components of computer 201 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 223 may include components such as a display screen, speaker, microphone, wearable devices (such as goggles and smart watches), keyboard, mouse, printer, touchpad, game controllers, and haptic devices. Storage 224 is external storage, such as an external hard drive, or insertable storage, such as an SD card. Storage 224 may be persistent and/or volatile. In some embodiments, storage 224 may take the form of a quantum computing storage device for storing data in the form of qubits. In embodiments where computer 201 is required to have a large amount of storage (for example, where computer 201 locally stores and manages a large database) then this storage may be provided by peripheral storage devices designed for storing very large amounts of data, such as a storage area network (SAN) that is shared by multiple, geographically distributed computers. IoT sensor set 225 is made up of sensors that can be used in Internet of Things applications. For example, one sensor may be a thermometer and another sensor may be a motion detector.

NETWORK MODULE 215 is the collection of computer software, hardware, and firmware that allows computer 201 to communicate with other computers through WAN 202. Network module 215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 215 are performed on the same physical hardware device. In other embodiments (for example, embodiments that utilize software-defined networking (SDN)), the control functions and the forwarding functions of network module 215 are performed on physically separate devices, such that the control functions manage several different network hardware devices. Computer readable program instructions for performing the inventive methods can typically be downloaded to computer 201 from an external computer or external storage device through a network adapter card or network interface included in network module 215.

WAN 202 is any wide area network (for example, the internet) capable of communicating computer data over non-local distances by any technology for communicating computer data, now known or to be developed in the future. In some embodiments, the WAN 202 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 203 is any computer system that is used and controlled by an end user (for example, a customer of an enterprise that operates computer 201) and may take any of the forms discussed above in connection with computer 201. EUD 203 typically receives helpful and useful data from the operations of computer 201. For example, in a hypothetical case where computer 201 is designed to provide a recommendation to an end user, this recommendation would typically be communicated from network module 215 of computer 201 through WAN 202 to EUD 203. In this way, EUD 203 can display, or otherwise present, the recommendation to an end user. In some embodiments, EUD 203 may be a client device, such as thin client, heavy client, mainframe computer, desktop computer and so on.

REMOTE SERVER 204 is any computer system that serves at least some data and/or functionality to computer 201. Remote server 204 may be controlled and used by the same entity that operates computer 201. Remote server 204 represents the machine(s) that collect and store helpful and useful data for use by other computers, such as computer 201. For example, in a hypothetical case where computer 201 is designed and programmed to provide a recommendation based on historical data, then this historical data may be provided to computer 201 from remote database 230 of remote server 204.

PUBLIC CLOUD 205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 205 is performed by the computer hardware and/or software of cloud orchestration module 241. The computing resources provided by public cloud 205 are typically implemented by virtual computing environments that run on various computers making up the computers of host physical machine set 242, which is the universe of physical computers in and/or available to public cloud 205. The virtual computing environments (VCEs) typically take the form of virtual machines from virtual machine set 243 and/or containers from container set 244. It is understood that these VCEs may be stored as images and may be transferred among and between the various physical machine hosts, either as images or after instantiation of the VCE. Cloud orchestration module 241 manages the transfer and storage of images, deploys new instantiations of VCEs and manages active instantiations of VCE deployments. Gateway 240 is the collection of computer software, hardware, and firmware that allows public cloud 205 to communicate through WAN 202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 206 is similar to public cloud 205, except that the computing resources are only available for use by a single enterprise. While private cloud 206 is depicted as being in communication with WAN 202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 205 and private cloud 206 are both part of a larger hybrid cloud.

Figure 3:
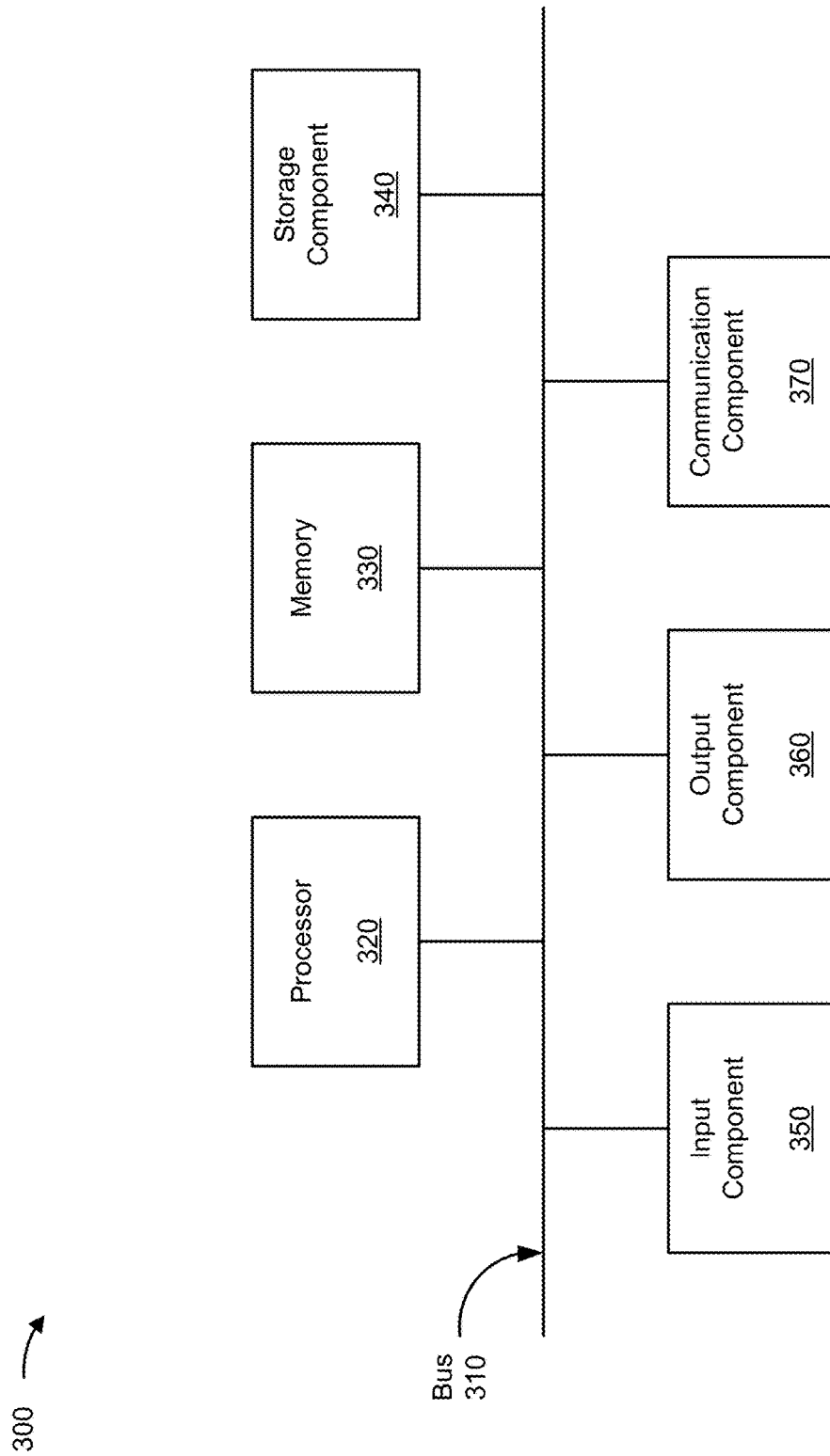
FIG. 3 is a diagram of example components of one or more devices of FIGS. 1 and 2.

FIG. 3 is a diagram of example components of a device 300, which may correspond to user device 105 and/or code translation validation platform 110. In some implementations, user device 105 and/or code translation validation platform 110 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may be a repository that stores a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
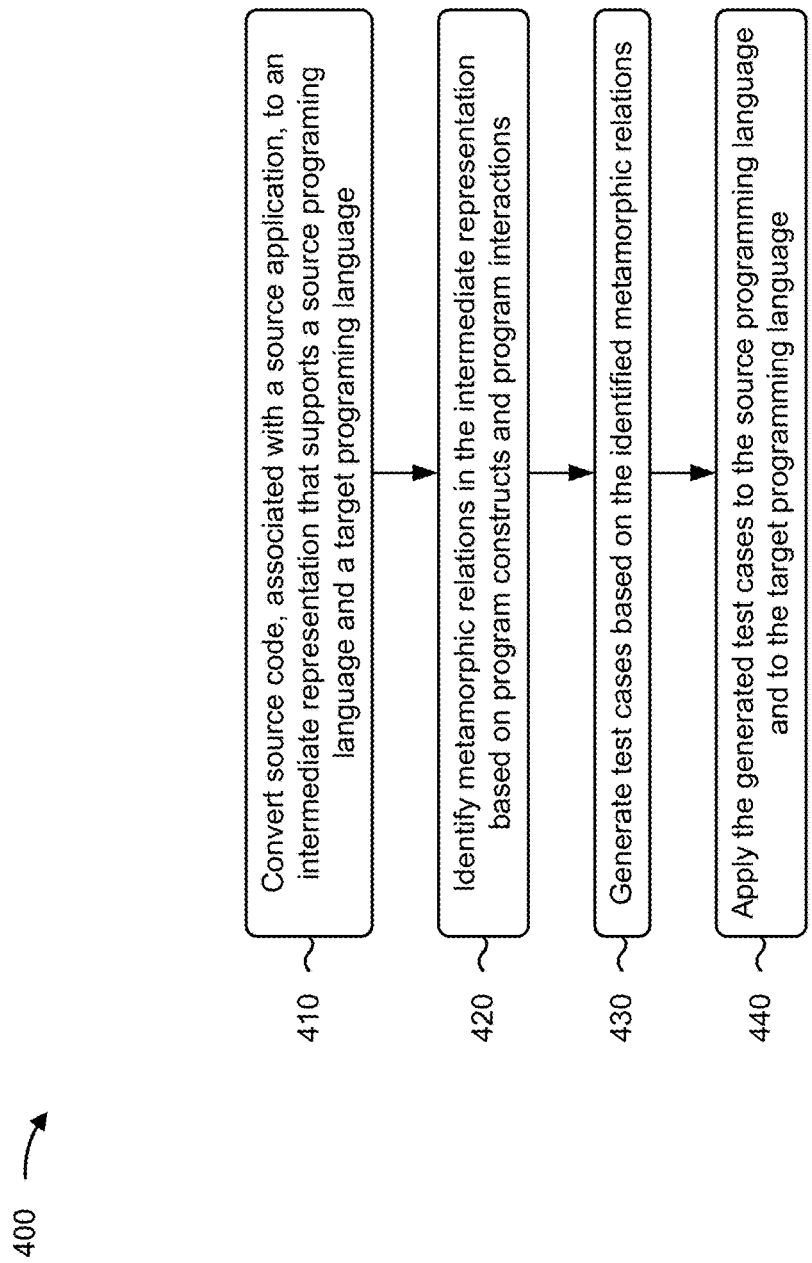
FIG. 4 is a flowchart of an example process associated with validating code translation based on an intermediate representation.

FIG. 4 is a flowchart of an example process 400 associated with validating code translation based on an intermediate representation. In some implementations, one or more process blocks of FIG. 4 may be performed by a code translation validation platform (e.g., code translation validation platform 110). In some implementations, one or more process blocks of FIG. 4 may be performed by another device or a group of devices separate from or including the domain transformation system, such as a user device (e.g., user device 105). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include converting source code, associated with a source application, to an intermediate representation that supports a source programing language and a target programing language (block 410). For example, the code translation validation platform may convert source code, associated with a source application, to an intermediate representation that supports a source programing language and a target programing language, as described above.

As further shown in FIG. 4, process 400 may include identifying metamorphic relations in the intermediate representation based on program constructs and program interactions (block 420). For example, the code translation validation platform may identify metamorphic relations in the intermediate representation based on program constructs and program interactions, as described above.

As further shown in FIG. 4, process 400 may include generating test cases based on the identified metamorphic relations (block 430). For example, the code translation validation platform may generate test cases based on the identified metamorphic relations, as described above.

As further shown in FIG. 4, process 400 may include applying the generated test cases to the source programming language and to the target programming language (block 440). For example, the code translation validation platform may apply the generated test cases to the source programming language and to the target programming language, as described above.

In some implementations, the source code is a first source code written in the source programming language, wherein a second source code is a translation of the first source code into the target programming language, and wherein applying the generated test cases comprises applying the generated test cases to the first source code and to the second source code to validate the translation of the first source code.

In some implementations, applying the generated test cases comprises applying the generated test cases to the first source code and to the second source code to determine whether the second source code is syntactically and semantically equivalent to the first source code.

In some implementations, applying the generated test cases comprises detecting a failure resulting from applying the generated test cases to the second source code, and determining that the second source code is not a valid translation of the first source code.

In some implementations, generating the test cases comprises generating metamorphic test cases of metamorphic testing, the metamorphic test cases are applied to the source programming language and to the target programming language.

In some implementations, identifying the metamorphic relations comprises identifying metamorphic relations based input and output operations associated with the source.

In some implementations, the program constructs include syntaxes of the source programming language, and wherein the program interactions include semantics of the source programming language.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A computer-implemented method comprising:
converting source code, associated with a source application, to an intermediate representation that supports a source programming language and a target programing language;
identifying metamorphic relations in the intermediate representation based on program constructs and program interactions;
generating first test cases based on the identified metamorphic relations,
wherein the first test cases are converted to second test cases for the source programming language, and
wherein the first test cases are converted to third test cases for the target programming language; and
applying the second test cases to the source programming language and the third test cases to the target programming language.

2. The computer-implemented method of claim 1, wherein the source code is a first source code written in the source programming language,
wherein a second source code is a translation of the first source code into the target programming language, and
wherein applying the second test cases to the source programming language and the third test cases to the target programming language comprises:
applying the second test cases to the first source code and the third test cases to the second source code to validate the translation of the first source code.

3. The computer-implemented method of claim 2, wherein applying the second test cases to the source programming language and the third test cases to the target programming language comprises:
applying the second test cases to the first source code and the third test cases to the second source code to determine whether the second source code is syntactically and semantically equivalent to the first source code.

4. The computer-implemented method of claim 2, wherein applying the second test cases to the source programming language and the third test cases to the target programming language comprises:
  detecting a failure resulting from applying the third test cases to the second source code; and
  determining that the translation of the first source code is not valid.

5. The computer-implemented method of claim 1, wherein generating the first test cases comprises:
  generating metamorphic test cases of metamorphic testing,
    wherein the metamorphic test cases are applied to the source programming language and to the target programming language.

6. The computer-implemented method of claim 1, wherein identifying the metamorphic relations comprises:
  identifying metamorphic relations based input and output operations associated with the source code.

7. The computer-implemented method of claim 1, wherein the program constructs include syntaxes of the source programming language, and
  wherein the program interactions include semantics of the source programming language.

8. A computer program product comprising:
  one or more computer readable storage medium, and program instructions collectively stored on the one or more computer readable storage medium, the program instructions comprising:
  program instructions to convert a first source code, of a source programing language, to an intermediate representation that supports the source programing language and a target programing language;
  program instructions to perform an action using the intermediate representation;
  program instructions to generate first test cases based on a result of performing the action,
    wherein the first test cases are converted to second test cases for the source programming language, and
    wherein the first test cases are converted to third test cases for the target programming language;
  program instructions to apply the second test cases to the first source code and the third test cases to a second source code of the target programming language; and
  program instructions to determine, based on applying the second test cases to the first source code and the third test cases to the second source code, whether the second source code is a valid translation of the first source code.

9. The computer program product of claim 8, wherein the program instructions to perform the action comprise:
  program instructions to identify metamorphic relations in the intermediate representation based on program constructs of the source programing language and program interactions of the source programing language.

10. The computer program product of claim 9, wherein the program instructions to generate the first test cases comprise:
  program instructions to generate test cases based on the identified metamorphic relations.

11. The computer program product of claim 8, wherein the program instructions to perform the action comprise:
  program instructions to perform symbolic execution on the intermediate representation.

12. The computer program product of claim 11, wherein the program instructions to generate the first test cases comprise:
  program instructions to generate test cases for the intermediate representation based on performing the symbolic execution on the intermediate representation.

13. The computer program product of claim 11, wherein the program instructions further comprise:
  program instructions to convert the first test cases to the second test cases for the source programming language; and
  program instructions to convert the first test cases to the third test cases for the target programming language.

14. The computer program product of claim 13, wherein the program instructions to determine whether the second source code is a valid translation of the first source code comprise:
  program instructions to compare first outputs of applying the second test cases and second outputs of applying the third test cases; and
  program instructions to determine whether the second source code is a valid translation of the first source code based on comparing the first outputs and the second outputs.

15. A system comprising:
  one or more devices configured to:
    convert a first source code, of a source programing language, to an intermediate representation that supports the source programing language and a target programing language;
    generate first test cases based on the intermediate representation;
    convert the first test cases to second test cases for the source programming language;
    convert the first test cases to third test cases for the target programming language;
    apply the second test cases to the first source code and the third test cases to a second source code of the target programming language; and
    determine, based on applying the second test cases to the first source code and the third test cases to the second source code, whether the second source code is a valid translation of the first source code.

16. The system of claim 15, wherein, to generate the first test cases, the one or more devices are configured to:
  generate the first test cases based on symbolic execution of the intermediate representation.

17. The system of claim 16, wherein, to generate the first test cases based on the symbolic execution, the one or more devices are configured to:
  generate the first test cases based on constraint solvers.

18. The system of claim 15, wherein, to generate the first test cases, the one or more devices are configured to:
  identify metamorphic relations in the intermediate representation based on program constructs of the source programing language and program interactions of the source programing language; and
  generate the first test cases based on the identified metamorphic relations.

19. The system of claim 18, wherein, to determine whether the second source code is a valid translation of the first source code, the one or more devices are configured to:
  compare first outputs of applying the second test cases and second outputs of applying the third test cases; and
  determine whether the second source code is a valid translation of the first source code based on comparing the first outputs and the second outputs.

20. The system of claim 15, wherein, to determine whether the second source code is a valid translation of the first source code, the one or more devices are configured to:

detect a failure resulting from applying the third test cases; and determine that the second source code is not a valid translation of the first source code.

\* \* \* \* \*